United States Patent
Gaither et al.

(10) Patent No.: US 10,766,380 B2
(45) Date of Patent: Sep. 8, 2020

(54) AUTOMOTIVE WINDOW OPENING FOR BATTERY COOLING

(71) Applicant: Toyota Motor Engineering & Manufacturing North America, Inc., Plano, TX (US)

(72) Inventors: Geoffrey D. Gaither, Brighton, MI (US); Tapan V. Patel, Lakewood, CA (US); Justin J. Chow, Los Angeles, CA (US); Joshua D. Payne, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 107 days.

(21) Appl. No.: 16/128,356

(22) Filed: Sep. 11, 2018

(65) Prior Publication Data
US 2020/0079226 A1  Mar. 12, 2020

(51) Int. Cl.
*H01M 10/625* (2014.01)
*B60L 58/26* (2019.01)
*E05F 15/71* (2015.01)
*B60H 1/00* (2006.01)

(52) U.S. Cl.
CPC .......... *B60L 58/26* (2019.02); *B60H 1/00278* (2013.01); *B60H 1/00664* (2013.01); *E05F 15/71* (2015.01); *B60L 2240/36* (2013.01); *E05Y 2900/55* (2013.01)

(58) Field of Classification Search
CPC ... H01M 10/625; H01M 10/613; B60L 58/26; B60L 2240/545; B60H 1/00278
See application file for complete search history.

(56) References Cited

U.S. PATENT DOCUMENTS

| | | |
|---|---|---|
| 6,138,466 A | 10/2000 | Lake et al. |
| 7,143,724 B2 | 12/2006 | Hashizumi et al. |
| 7,728,546 B2 | 6/2010 | Tanaka et al. |
| 7,963,831 B2 | 6/2011 | He et al. |
| 8,585,800 B2 | 11/2013 | Lim |
| 8,679,662 B2 | 3/2014 | Maguire et al. |
| 9,440,523 B2 | 9/2016 | Decker |

(Continued)

FOREIGN PATENT DOCUMENTS

| | | |
|---|---|---|
| CN | 102963320 A | 3/2013 |
| CN | 105416219 A | 3/2016 |

*Primary Examiner* — Kenneth J Malkowski
(74) *Attorney, Agent, or Firm* — Snell & Wilmer LLP (57) ABSTRACT

Methods, systems, and devices for controlling a temperature of a battery of a vehicle. The battery management system includes a battery for storing and distributing an electrical charge. The battery management system includes a temperature for measuring or detecting a temperature of the battery. The battery management system includes one or more temperature control devices for controlling the temperature of the battery. The battery management system includes an electronic control unit configured to obtain the temperature of the battery and determine whether the temperature of the battery exceeds an optimal temperature range. The electronic control unit is configured to operate the one or more temperature control devices when the temperature of the battery exceeds the optimal temperature range to adjust the temperature to be within the optimal temperature range.

19 Claims, 7 Drawing Sheets

(56) References Cited

U.S. PATENT DOCUMENTS

| | | |
|---|---|---|
| 9,583,800 B2 | 2/2017 | Hwang et al. |
| 9,855,820 B2 | 1/2018 | Baron et al. |
| 9,905,821 B2 | 2/2018 | Eberhard et al. |
| 9,919,581 B2 | 3/2018 | Satzger et al. |
| 9,941,555 B2 | 4/2018 | Hermann |
| 2011/0016899 A1* | 1/2011 | Ogura ................ B60H 1/00278 62/239 |
| 2011/0059341 A1* | 3/2011 | Matsumoto ........ B60H 1/00978 429/82 |
| 2017/0187014 A1 | 6/2017 | Rank et al. |
| 2019/0315185 A1* | 10/2019 | Kim .................. B60H 1/00899 |

* cited by examiner

AUTOMOTIVE WINDOW OPENING FOR BATTERY COOLING

BACKGROUND

Field

This specification relates to managing or controlling a temperature of the battery of the vehicle.

Description of the Related Art

Hybrid or electric vehicle batteries, e.g., lithium-ion batteries, need to be maintained within a temperature range to operate at optimal efficiency. The vehicle battery stores an electrical charge that is provided or supplied to an electric motor. The electric motor converts the electrical energy to mechanical energy that powers the vehicle. During charging and/or discharging of the electrical energy, heat is produced and the temperature of the vehicle battery generally increases. Various other factors also affect and influence the vehicle battery temperature. If the hybrid or electric vehicle operates when the battery temperature exceeds the efficient or normal temperature range, the vehicle battery performance suffers.

Also, when the temperature of the vehicle battery overheats, damage to the vehicle battery may occur. This may reduce the overall performance and lifespan of the vehicle battery. In extreme cases, an overheated vehicle battery may present a safety issue. Moreover, when the temperature of the vehicle battery is too cold, the vehicle may have difficulty starting or providing an adequate charge to propel or operate the vehicle. Regardless, the vehicle battery usage when the temperature of the vehicle battery exceeds the normal operation temperature range decreases the overall efficiency of the vehicle battery.

Accordingly, there is a need for a system, apparatus and/or a method to maintain and/or control the temperature of the vehicle battery.

SUMMARY

In general, one aspect of the subject matter described in this specification may be embodied in a battery management system for controlling a temperature of a battery of a vehicle. The battery management system includes a battery for storing and distributing an electrical charge. The battery management system includes a sensor for measuring or detecting a temperature of the battery. The battery management system includes one or more temperature control devices for controlling the temperature of the battery. The battery management system includes an electronic control unit. The electronic control unit is coupled to the battery, the sensor and the one or more temperature control devices. The electronic control unit is configured to obtain the temperature of the battery and determine whether the temperature of the battery exceeds an optimal temperature range. The electronic control unit is configured to operate the one or more temperature control devices when the temperature of the battery exceeds the optimal temperature range to adjust the temperature to be within the optimal temperature range.

These and other embodiments may optionally include one or more of the following features. The one or more temperature control devices may include at least one of a blower of a heating, ventilation and air conditioning (HVAC) unit, a window, a purge vent, an intake vent or a separate blower. The electronic control unit may be configured to determine that the temperature of the battery is greater than the optimal temperature range. The electronic control unit may be configured to increase a speed of the blower to direct more colder air toward the battery to cool the battery, open the purge vent to exhaust air surrounding the battery, and/or cause the window to open to increase an amount of colder air directed toward the battery to cool the battery.

The electronic control unit may determine if or when the temperature of the battery is less than the optimal temperature range. The electronic control unit may determine a difference between the temperature of the battery and a minimum of the optimal temperature range. The electronic control unit may cause the one or more temperature control devices to decrease circulation of cold air or increase circulation of warm air to raise the temperature of the battery based on the difference. The electronic control unit may determine if or when the temperature of the battery exceeds the optimal temperature range. The electronic control unit may control the one or more temperature control devices to increase the temperature of the battery if or when the temperature of the battery is below the optimal temperature range and decrease the temperature of the battery if or when the temperature of the battery is above the optimal temperature range. The electronic control unit may adjust a bypass valve or switch that diverts coolant from the HVAC unit to the battery to cool the battery.

In another aspect, the subject matter may be embodied in a battery management system of a vehicle. The battery management system of the vehicle includes a battery for storing and distributing an electrical charge. The battery management system includes one or more temperature control devices that manage a battery compartment temperature. The battery management system includes an electronic control unit. The electronic control unit is coupled to the battery and the one or more temperature control devices. The electronic control unit is configured to obtain a battery temperature. The electronic control unit is configured to determine if or when the battery temperature exceeds a normal operation temperature range. The electronic control unit is configured to control the one or more temperature control devices to increase the battery compartment temperature if or when the battery temperature is less than the normal operation temperature range. The electronic control unit is configured to control the one or more temperature control devices to decrease the battery compartment temperature if or when the battery temperature is greater than the normal operation temperature range.

In another aspect, the subject matter may be embodied in a method for controlling a temperature of a battery of a vehicle. The method includes obtaining, by a processor, a battery temperature of the battery. The method includes determining, by the processor, if or when the battery temperature exceeds a normal operation temperature range. The method includes increasing, by the processor using one or more temperature control devices, air flow directed at the battery to reduce the battery temperature if or when the battery temperature is greater than the normal operation temperature range. The method includes purging, by the processor using one or more temperature control devices, air surrounding the battery to reduce the battery temperature if or when the battery temperature is greater than the normal operation temperature range.

BRIEF DESCRIPTION OF THE DRAWINGS

Other systems, methods, features, and advantages of the present invention will be apparent to one skilled in the art

DETAILED DESCRIPTION

Disclosed herein are systems, devices, apparatuses and methods for managing and/or controlling the temperature of the battery of a vehicle. Particular embodiments of the subject matter described in this specification may be implemented to realize one or more of the following advantages. The battery temperature management system (or "battery management system") controls or adjusts the temperature of the battery of the vehicle. The battery management system may increase or decrease the temperature of the battery of the vehicle. The battery management system controls one or more temperature control devices, such as a window, an intake vent or a purge vent, a bypass valve, a blower and/or a heating, ventilation, and/or air conditioning (HVAC) blower, to control the temperature of the battery. For example, the battery management system may open, partially open or close a window. In another example, the battery management system may open, partially open or close a bypass valve that diverts a heat exchange medium from the heating, ventilation and/or air conditioning (HVAC) unit to the battery to cool the battery, respectively.

By maintaining the temperature of the battery of the vehicle, the battery may operate at optimal efficiency and reduce the amount of damage to the battery due to overheating, usage and/or aging. Moreover, the battery may more efficiently deliver or provide electrical energy to the motor to convert to mechanical energy. This increases the energy efficiency of the vehicle.

Other benefits and advantages include predicting the need to cool or warm the battery. The battery management system may account for other factors, such as the inside and/or outside ambient temperature. The battery management system may anticipate that the battery needs to be warmed and/or cooled based on the other factors. By anticipating the battery needs, the battery management system prevents the temperature of the battery from exceeding the normal operation temperature range.

Additionally, the battery management system may use an independent temperature control device. The independent temperature control device, such as a solar powered blower, operates independently from the battery. Thus, the independent temperature control device may assist in maintaining the temperature of the battery without relying on the battery as a source of power. This allows the battery management system to cool the battery even if the battery is non-operational to maintain the battery temperature within the normal operation range.

Figure 1:
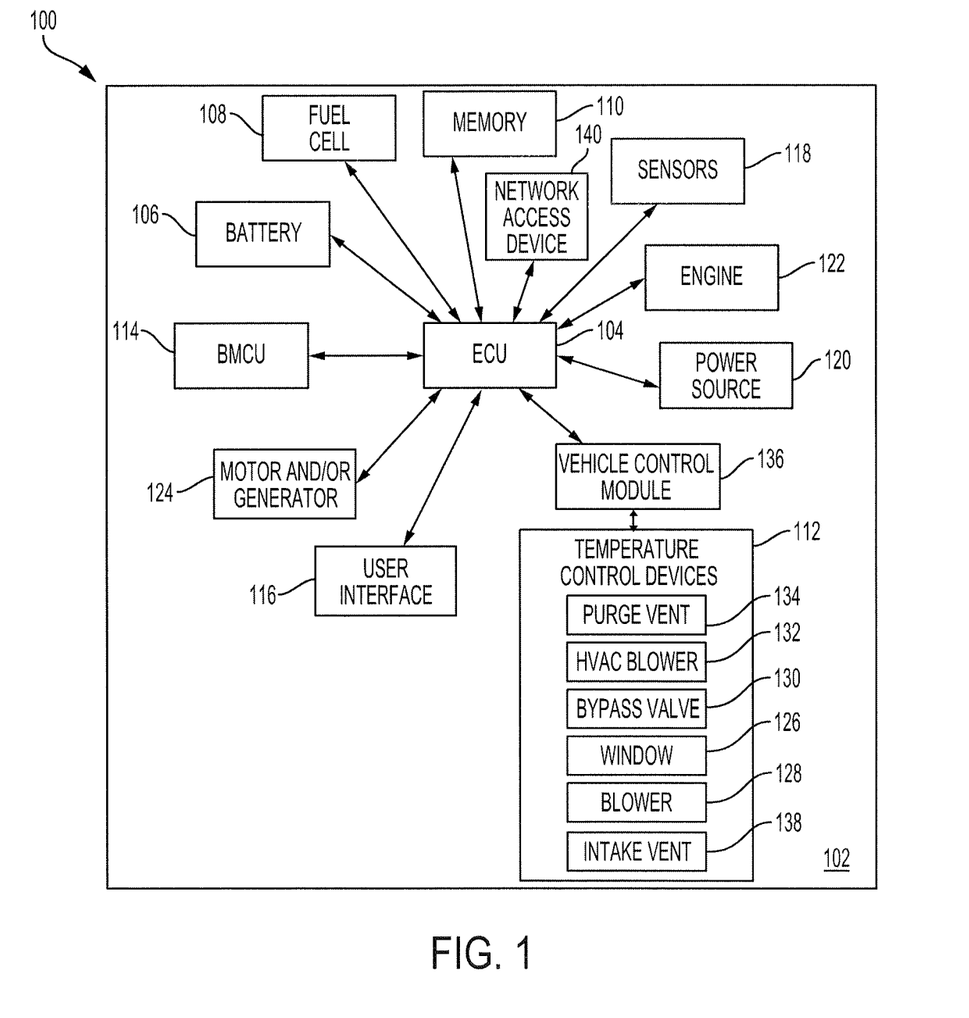
FIG. 1 is a block diagram of an example battery management system according to an aspect of the invention.

FIG. 1 is a block diagram of a battery management system 100. The battery management system 100 manages and/or controls the temperature of the battery 106 of the vehicle 102. The battery management system 100 may be installed, included, part-of, or retrofitted within a vehicle 102 to manage or control the temperature of the battery 106. The battery management system 100 may measure, determine and/or predict a temperature of the battery 106 (or "battery temperature") and/or adjust the battery temperature to maintain the battery temperature within an optimal temperature range. In order to increase or decrease the battery temperature, the one or more temperature control devices 112 may increase or decrease the temperature of the surrounding environment of the battery 106 and/or the amount of circulation or ventilation of the air of the surrounding environment, which increases or decreases, respectively, the battery temperature. The optimal temperature range is a normal operation range where the battery 106 operates most efficiently and is within hardware limitations, e.g., approximately 10° C.-45° C. This allows the battery 106 to charge and provide electrical energy to the motor more efficiently, which reduces the cost and the amount of time to charge the vehicle 102 and operates the vehicle 102 more efficiently. This also extends the life of the battery 106.

A vehicle, e.g., vehicle 102, is a conveyance capable of transporting a person or persons or any material or any permanently or temporarily affixed apparatus. The vehicle may be a self-propelled wheeled conveyance, such as a car, a truck, a bus, a van or other motor and/or battery driven vehicle. For example, the vehicle 102 may be an electric vehicle, such as a hydrogen powered electric vehicle, a hybrid vehicle, or a plug-in hybrid vehicle. Other examples of vehicles include bicycles, trains, planes, or boats, and any other form of conveyance that is capable of transportation. The vehicle 102 may be a semi-autonomous or an autonomous vehicle. That is, the vehicle 102 may be self-maneuvering and capable of sensing the environment and navigating without human input.

The battery management system 100 includes a processor, such as an electronic control unit (ECU) 104, a battery 106, a memory 110, a battery management and control unit (BMCU) 114, a vehicle control module 136 and/or one or more temperature control devices 112. The battery management system 100 may include a user interface 116, one or more sensors 118 and/or an independent power source ("power source") 120. The battery management system 100 and/or the vehicle 102 may include other components, such as a network access device 140, a fuel cell 108, an engine 122 and/or a motor and/or generator 124.

The battery management system 100 includes a processor, such as the electronic control unit 104, that is programmed to control the one or more temperature control devices 112 and/or the one or more sensors 118. The ECU 104 may detect, measure, predict or otherwise obtain the battery temperature and control the one or more temperature control devices 112 to adjust or change the battery temperature. For example, the ECU 104 may adjust a position of a window 126, adjust or control components of a heating, ventilation and air conditioning (HVAC) unit, adjust a separate blower 128 or adjust a position of a purge vent 134, an intake vent 138 or a bypass valve or switch ("bypass valve") 130. The battery management system 100 may use a different controller or processor, such as the vehicle control module 136, to control or manage the one or more temperature control devices 112.

The ECU 104 may be coupled to the memory 110. The memory 110 may store instructions to execute on the ECU 104 and may include one or more of a random access memory (RAM) or other volatile or non-volatile memory. The memory 110 may be a non-transitory memory or a data storage device, such as a hard disk drive, a solid-state disk drive, a hybrid disk drive, or other appropriate data storage. The memory 110 may further store machine-readable instructions, which may be loaded and executed by the ECU 104 to control and/or manage the battery temperature.

The battery management system 100 includes the battery 106. The battery 106 may be coupled to the motor and/or generator 124. The battery 106 provides electrical energy to the motor and/or generator 124. The battery 106 may receive electrical energy from the motor and/or generator 124 and store the electrical energy. The battery 106 may include one or more rechargeable batteries.

The motor and/or generator 124 may be coupled to the battery 106 and/or a fuel cell 108. The motor and/or generator 124 may convert the electrical energy from the battery 106 and/or the fuel cell 108 into mechanical power, such as torque, and may convert mechanical power into electrical energy. The motor and/or generator 124 may provide energy back to the battery 106 for storage, for example, via regenerative braking. In some implementations, the vehicle 102 may include one or more additional power generation devices such as the engine 122 or the fuel cell 108. The engine 122 combusts fuel to provide power instead of and/or in addition to the power supplied by the motor and/or generator 124. The fuel cell 108 may generate electrical energy for storage in the battery 106. Air within the fuel cell may react with a fuel to generate the electrical energy. The electrical energy may be provided to the motor and/or generator 124 to power the vehicle 102.

The BMCU 114 may be coupled to the battery 106 and may control and manage the charging and/or discharging of the battery 106. The BMCU 114, for example, may measure, using battery sensors, parameters used to determine the state of charge (SOC) of the battery 106.

The battery management system 100 includes one or more temperature control devices 112. The one or more temperature control devices 112 may provide air circulation, ventilation or a heat exchange medium to the battery 106. The air circulation, air ventilation and/or heat exchange medium increases, decreases, maintains and/or otherwise controls or affects the battery temperature. For example, the one or more temperature control devices 112 may provide cool air to surround the battery 106 to decrease the battery temperature.

Figure 2:
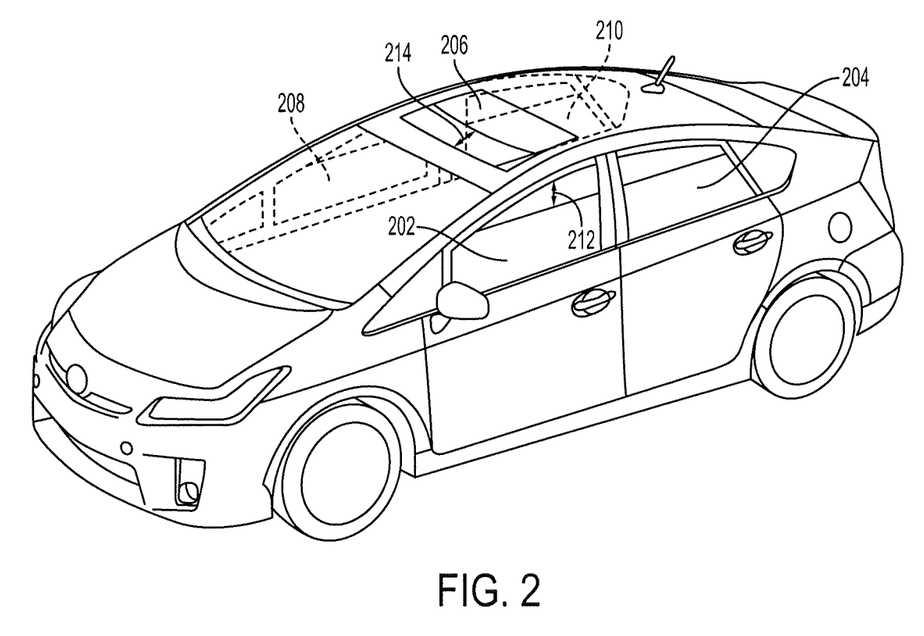
FIG. 2 shows an example of different windows that the battery management system of FIG. 1 controls according to an aspect of the invention.

The one or more temperature control devices 112 may include one or more windows 126, one or more blowers, such as a blower 128 or a heating, ventilation and air conditioning unit (HVAC) blower 132, an intake vent 138 and/or one or more purge vents 134. The blower 128 or the HVAC blower 132 may direct air from or going to the cabin of the vehicle 102 into the battery compartment or area to maintain the battery temperature. The one or more windows 126 may include a rear passenger-side window 210, a front passenger-side window 208, a front driver-side window 202, a rear-driver-side window 204 and/or a sun-roof window 206. The one or more windows 126 may be opened, partially opened and/or closed to adjust the amount of air circulation and/or ventilation into the passenger cabin of the vehicle 102. The air within the passenger cabin of the vehicle 102 may be ventilated, funneled and/or otherwise directed toward a battery compartment or area where the battery 106 is positioned within the vehicle 102 using the intake vent 138, for example. FIG. 2 shows various windows that may be controlled by the battery management system 100. For example, the battery management system 100 may raise or lower the passenger-side and/or driver-side windows along the path 212. In another example, the battery management system 100 may open, partially open or close the sun-roof window 206 along the path 214.

Figure 3:
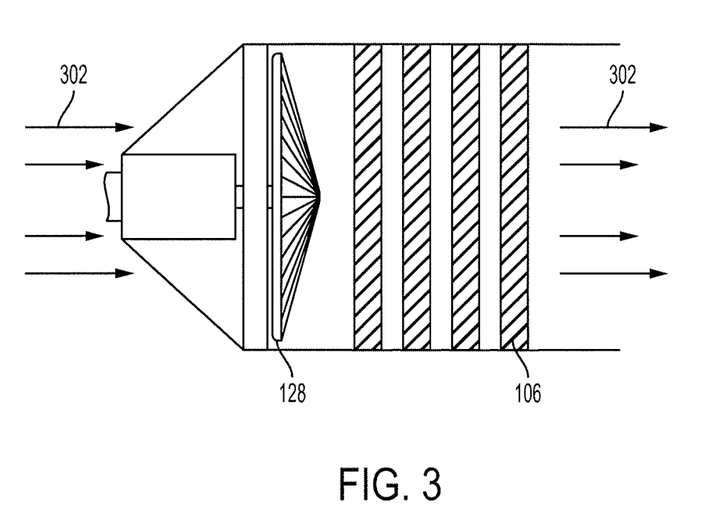
FIG. 3 shows an example blower of the battery management system of FIG. 1 according to an aspect of the invention.
Figure 4:
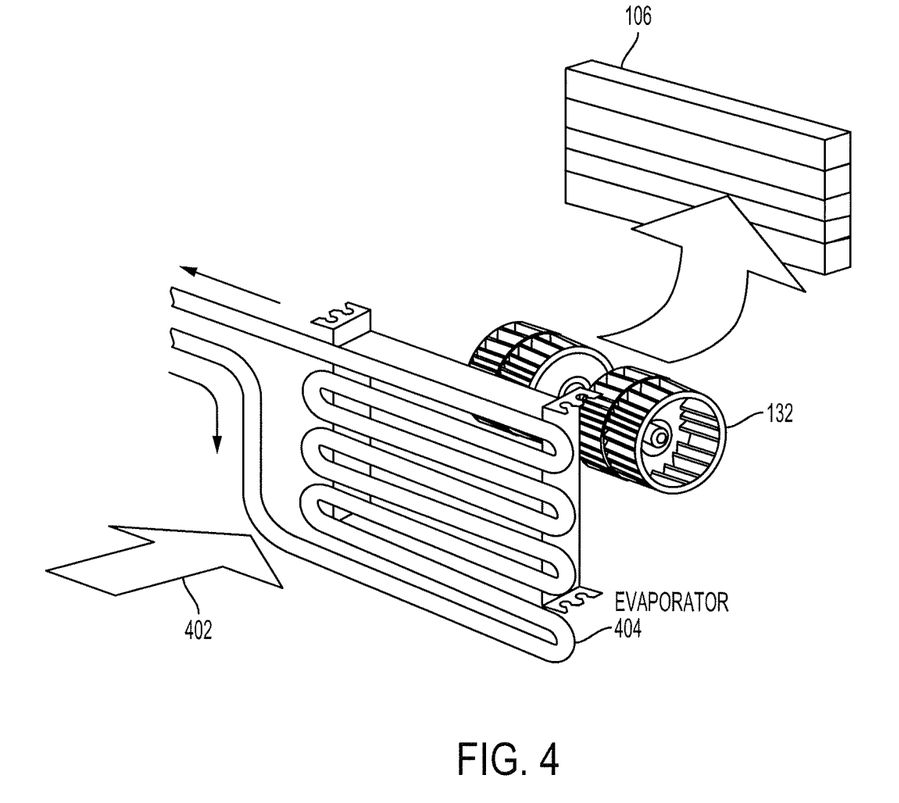
FIG. 4 shows an example heating, ventilation and air condition (HVAC) blower of the battery management system of FIG. 1 according to an aspect of the invention.

The one or more temperature control devices 112 may include one or more blowers, such as a blower 128 or an HVAC blower 132. The one or more blowers may be a separate blower, such as the blower 128, or a blower that is part of the HVAC unit, such as the HVAC blower 132. The blower 128 may be an independent blower that has or is coupled to an independent power source, such as the power source 120. The HVAC blower 132 provides heating, cooling and/or ventilation to the passenger cabin of the vehicle 102. A portion of the air that is directed to the passenger cabin by the HVAC blower 132 may be ventilated, funneled and/or otherwise directed toward a battery compartment or area where the battery is positioned within the vehicle 102 using the intake vent 138, for example. FIG. 3 shows the blower 128, which circulates the air 302 between the batteries 106. The blower 128 may circulate air between or around the battery compartment or area or in between interstitial spaces of the batteries 106. FIG. 4 shows the HVAC blower 132. The HVAC blower 132 passes air 402 that is cooled using the evaporator 404 through to the battery 106 to control the battery temperature.

Figure 5:
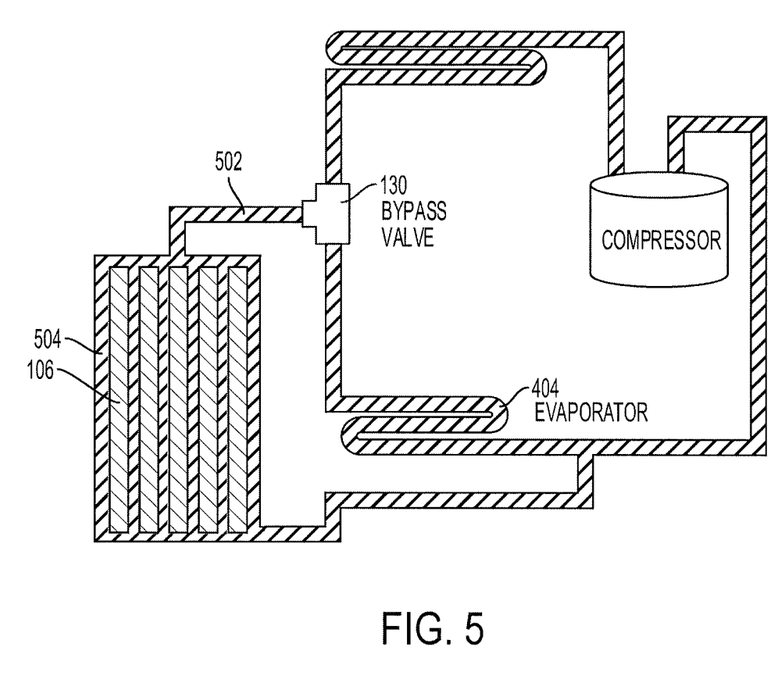
FIG. 5 shows an example bypass valve of the battery management system of FIG. 1 according to an aspect of the invention.

The one or more temperature control devices 112 may include an intake vent 138, a bypass valve 130 and/or a purge vent 134. The intake vent 138 may be positioned within the passenger cabin, such as below a seat, and divert or pull air in from the passenger cabin to the battery compartment or area to circulate air in proximity to the battery 106 to control the battery temperature of the battery 106. The bypass valve 130 may be part of the HVAC unit of the vehicle 102. The bypass valve 130 may divert a heat exchange medium or air to cool or warm the battery 106 of the vehicle 102. The bypass valve 130 may divert coolant 502, such as refrigerant, from the evaporator 404 of the HVAC unit to one or more pipes 504 surrounding the battery 106 to cool the battery 106, as shown in FIG. 5, for example. The purge vent 134 may exhaust, eject or otherwise blow air out of the battery compartment or area where the battery 106 is positioned within the vehicle 102. By exhausting, ejecting or otherwise blowing air out, the one or more temperature control devices 112 decreases the battery temperature.

The battery management system 100 may include a vehicle control module 136. The vehicle control module 136 may be a separate processor from the ECU 104 and may be coupled to the ECU 104. The vehicle control module 136 may receive data including commands and/or instructions from the ECU 104 to control or manage the one or more temperature control devices 112. The ECU 104 may directly command and/or control the one or more temperature control devices 112 or may indirectly command and/or control the one or more temperature control devices 112 through the vehicle control module 136.

The battery management system 100 may include a power source 120. The power source 120 is an independent power source from the battery 106 and independent from the fuel cell 108. The power source 120 may power one or more temperature control devices 112, such as the blower 128.

The power source 120 may be a separate battery, a solar panel, a solar power generation device or other power generation device.

The battery management system 100 may include a user interface 116. The user interface 116 may be a vehicle display or a personal device, e.g., a mobile phone, a tablet, a personal computer, that is connected to the ECU 104 through the network access device 140 across a network. The user interface 116 may include any device capable of receiving user input, such as a button, a dial, a microphone, or a touch screen, and any device capable of output, such as a display, a speaker, or a refreshable braille display. The user interface 116 allows a driver or a passenger of the vehicle 102 to communicate with the ECU 104. For example, the driver may be able to provide data to the ECU 104 and/or receive feedback from the ECU 104 via the user interface 116.

The battery management system 100 may include a network access device 140. The network access device 140 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 140 may transmit data to and receive data from devices and systems not directly connected to the vehicle 102. For example, the ECU 104 may communicate with an external database over a network to obtain the temperature outside the vehicle 102.

The battery management system 100 may include one or more sensors 118. The ECU 104 may be coupled to one or more sensors 118 that detect various parameters. For example, one or more temperature sensors may detect and/or measure the temperature of the battery 106, the temperature within the passenger cabin of the vehicle 102 and/or the temperature outside the vehicle 102. In another example, a speed sensor may detect and/or measure the speed of the blower 128 and/or the speed of the HVAC blower 132. In another example, a flow rate sensor may detect and/or measure the flow rate of a heat exchange medium that is diverted to cool the battery 106.

Figure 6:
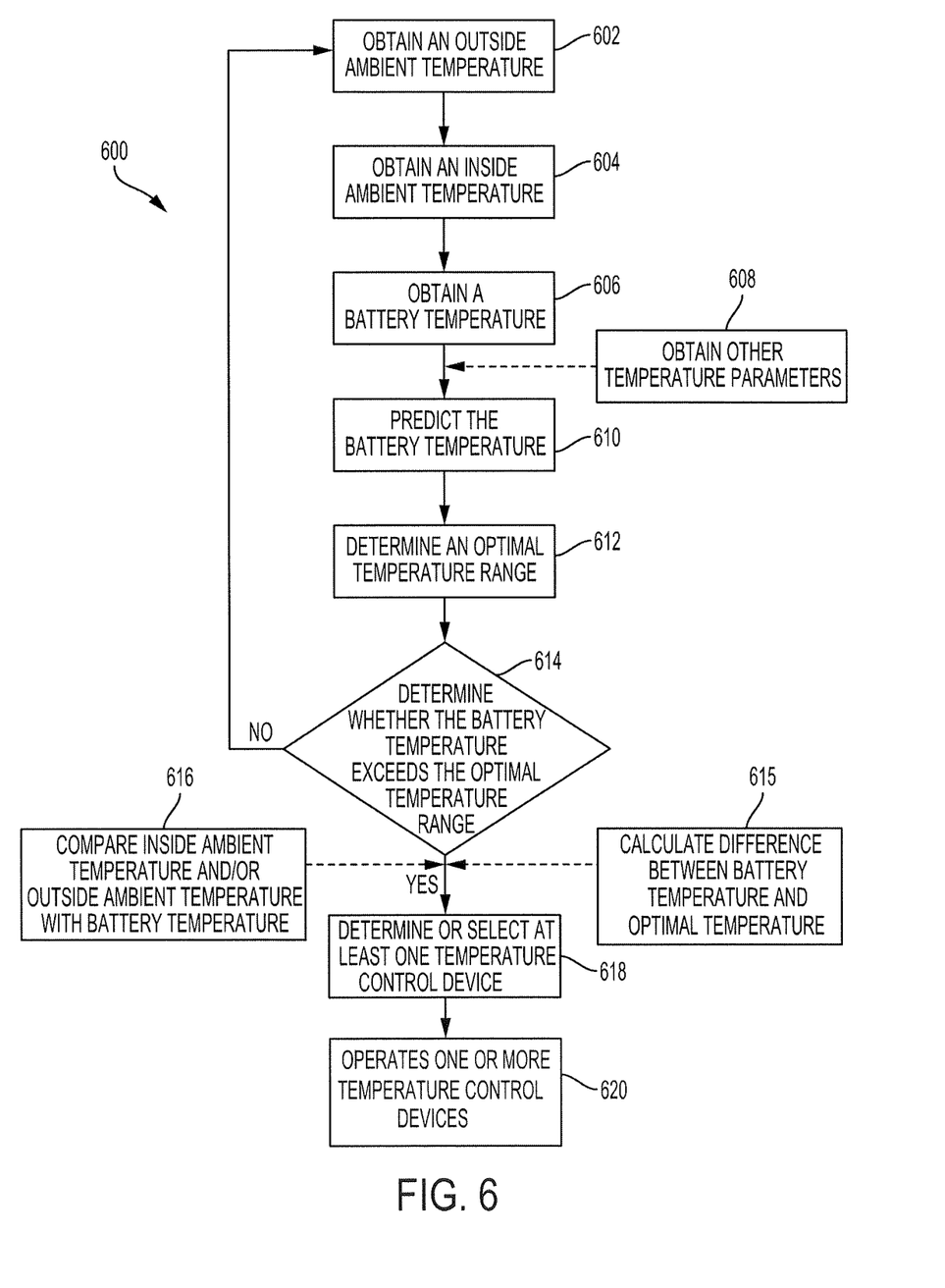
FIG. 6 is a flow diagram of an example process to maintain the temperature of the battery according to an aspect of the invention.

FIG. 6 describes the process for controlling or maintaining the battery temperature within an optimal temperature range. One or more computers or one or more data processing apparatuses, for example, the ECU 104 of the battery management system 100 of FIG. 1, appropriately programmed, may implement the process 600.

The battery management system 100 may obtain an outside ambient temperature of the environment outside the vehicle 102 (602). The battery management system 100 may use one or more sensors 118, such as a temperature sensor, to measure, detect, or otherwise determine the ambient temperature outside the vehicle 102. In some implementations, the battery management system 100 may connect to an external database or a service provider using the network access device 140 to obtain or download weather information that includes the outside ambient temperature. Once obtained, the ECU 104 may parse the weather information to obtain the outside ambient temperature.

The battery management system 100 may obtain an inside ambient temperature of the environment inside the vehicle 102 (604). The inside ambient temperature of the environment inside the vehicle 102 corresponds to the ambient temperature within the passenger cabin of the vehicle 102. The battery management system 100 may obtain the inside ambient temperature from user input and/or a user setting of the heating, ventilation and air conditioning (HVAC) unit. The battery management system 100 may use one or more sensors 118, such as a temperature sensor, to determine the inside ambient temperature. For example, a passenger or driver of the vehicle 102 may set a user-configured temperature for the HVAC unit via a user interface 116. The ECU 104 may use the user-configured temperature to calculate a target airflow temperature based on the user-configured temperature. The battery management system 100 may use either the user-configured temperature or the target airflow temperature as the inside ambient temperature. In another example, the battery management system 100 may have a temperature sensor positioned in the rear or front passenger cabin. The temperature sensor may measure the ambient temperature of the passenger cabin. The battery management system 100 may use the measured temperature of the passenger cabin as the inside ambient temperature.

The battery management system 100 obtains a battery temperature of the battery 106 of the vehicle 102 (606). The battery management system 100 may use one or more sensors 118, such as a battery temperature sensor, to obtain the battery temperature. The battery temperature sensor may be positioned in proximity or near the battery 106, such as within or near a battery enclosure, compartment or other area that is in proximity to the battery 106. The battery temperature sensor may measure or detect the temperature of the battery and/or the rate of increase or decrease of the temperature of the battery.

The battery management system 100 may obtain other temperature parameters (608). The other temperature parameters may include the rate that the current temperature of the battery is increasing or decreasing and/or the rate of energy usage or storage. One or more sensors 118, such as a battery sensor, may measure or detect these other temperature parameters.

The battery management system 100 may predict the battery temperature for the battery 106 (610). By predicting the battery temperature, the battery management system 100 may anticipate when the battery temperature would exceed an optimal temperature range and prevent the battery temperature from exceeding the optimal temperature range so that the battery 106 operates more efficiently.

The battery management system 100 may predict the battery temperature based on at least one of the obtained battery temperature, the inside ambient temperature, the outside ambient temperature and/or the other temperature parameters. The obtained battery temperature corresponds to the current temperature of the battery 106. The inside ambient temperature corresponds to the temperature within the passenger cabin of the vehicle 102, the target airflow temperature of the HVAC unit and/or the user-configured temperature for the passenger cabin of the vehicle 102. The outside ambient temperature corresponds to the temperature in the outside environment of the vehicle 102. The battery management system 100 may initially use the obtained battery temperature as a starting value and adjust the starting value to account for the differences between the inside ambient temperature and/or the outside ambient temperature with the obtained battery temperature.

For example, when the inside ambient temperature and/or outside ambient temperature is warmer than the obtained battery temperature, the battery management system 100 may predict that the battery temperature will naturally increase, and thus, the predicted battery temperature would be greater than the obtained battery temperature. In another example, when the inside ambient temperature and/or the outside ambient temperature is cooler than the obtained battery temperature, the battery management system 100 may predict that the battery temperature will naturally decrease, and thus, the predicted battery temperature would be less than the obtained battery temperature.

The amount that the predicted battery temperature would be greater than the obtained battery temperature and/or the amount that the predicted battery temperature would be less than the obtained battery temperature, may be based on and/or directly correlated or proportional with the difference between the inside and/or outside ambient temperature and the obtained battery temperature. For example, if the inside and/or outside ambient temperature is significantly greater than the obtained battery temperature, the battery temperature will naturally increase more and/or at a faster rate than when the inside and/or outside ambient temperature is only slightly greater than the obtained battery temperature. Similarly, if the inside and/or outside ambient temperature is significantly less than the obtained battery temperature, the battery temperature will naturally decrease more and/or at a faster rate than when the inside and/or outside ambient temperature is only slightly less than the obtained battery temperature. Thus, the predicted battery temperature and obtained battery temperature would have a larger difference when the differences between the inside and/or outside ambient temperature and the obtained battery temperature are greater.

In some implementations, the battery management system 100 may use the other temperature parameters to predict the battery temperature. For example, the battery management system 100 may account for the heat generated when charging and/or providing electrical energy to and/or from the battery 106. As the battery 106 is charged, the battery 106 generates additional heat, and so, the battery management system 100 may account for the additional heat when the battery management system 100 predicts the battery temperature. In another example, the battery management system 100 may account for the rate of charging and/or providing electrical energy to and/or from the battery 106. The faster the battery 106 is charged or provides electrical energy, the more additional heat is generated, and so, the battery management system 100 may account for the additional heat when the battery management system 100 predicts the battery temperature.

The battery management system 100 determines an optimal temperature range (612). The optimal temperature range is a normal operation temperature range for the battery 106. The normal operation temperature range may be approximately between 10° C.-45° C. or a pre-configured temperature range set at the factory or by a technician. When the battery temperature exceeds the normal operation temperature range, the battery output is throttled to prevent damage to the battery 106. The normal operation temperature range corresponds to a battery temperature at which the battery 106 operates most efficiently and within hardware limitations to minimize or prevent damage that occurs due to aging and/or usage. When the battery 106 operates within the optimal temperature range, the battery 106 maximizes charging efficiency and power delivery efficiency. That is, the least amount of electrical energy is lost during charging and/or power delivery.

The battery management system 100 determines whether the battery temperature exceeds the optimal temperature range (614). The battery temperature may refer to either the obtained battery temperature or the predicted battery temperature. The battery management system 100 compares the battery temperature to the optimal temperature range. If the battery temperature is outside, i.e., either greater than the maximum temperature of the optimal temperature range or less than the minimum temperature of the optimal temperature range, the battery management system 100 may determine that the battery temperature exceeds or will exceed (or is less than) the optimal temperature range. If the battery temperature does not exceed the optimal temperature range, the battery management system 100 continues to obtain and monitor the battery temperature. If the battery 106 does or will exceed the optimal temperature range, the battery management system 100 may determine or select at least one of the one or more temperature control devices 112 to adjust or control the battery temperature. If the battery 106 is less than the optimal temperature range, the battery management system 100 may determine or select at least one of the one or more temperature control devices 112 to adjust or control the battery temperature.

The battery management system 100 may calculate the difference between the battery temperature and the optimal temperature range (615). The battery management system 100 may compare the battery temperature with the average, maximum and/or minimum temperatures of the optimal temperature range and calculate the difference between the battery temperature and the average, maximum and/or minimum temperatures of the optimal temperature range.

The battery management system 100 may compare the inside ambient temperature, the outside ambient temperature and/or the battery temperature and determine the difference between the inside ambient temperature and/or the outside ambient temperature with the battery temperature (616). If the battery management system 100 determines that the inside ambient temperature and/or the outside ambient temperature exceeds the battery temperature, the battery management system 100 may use the comparison and/or determination when the battery management system 100 selects which of the one or more temperature control devices 112 to utilize to maintain the battery temperature within the optimal temperature range. Otherwise, the battery management system 100 may not account for differences in temperature between the inside ambient temperature and/or the outside ambient temperature. The battery management system 100 determines the difference between the battery temperature and the minimum temperature of the optimal temperature range when the battery temperature is less than the optimal temperature range. The battery management system 100 determines the difference between the battery temperature and the maximum temperature of the optimal temperature range when the battery temperature is greater than the optimal temperature range.

The battery management system 100 may determine or select the at least one of the one or more temperature control devices 112 to control or adjust the battery temperature based on the difference between the battery temperature and the optimal temperature range and/or the comparison between the inside and/or outside ambient temperature with the battery temperature (618).

For example, the battery management system 100 may determine that the outside ambient temperature is warmer or hotter than the battery temperature, and so the battery management system 100 may not open the window 126 to cool the battery 106 when the battery temperature is greater than the optimal temperature range. Instead, the battery management system 100 may select and use the purge vent 134 and exhaust the warm air around the battery 106 to reduce the battery temperature. In another example, if the outside ambient temperature is warmer or hotter than the battery temperature, the battery may open the window 126 or otherwise divert the outside ambient air into the battery compartment or area to warm the battery 106 to increase the battery temperature when the battery temperature is less than the optimal temperature range. In another example, if the difference between the battery temperature and the optimal temperature range is greater than a threshold amount, the battery management system 100 may select one of the one or more temperature control devices 112 instead of another one of the one or more temperature control devices 112. The battery management system 100 may select different temperature control devices at different threshold ranges. For example, the battery management system 100 may operate a first air temperature control device, such as a window, when the difference exceeds a first threshold amount and may operate a second temperature control device, such as the HVAC blower, when the difference exceeds a second threshold amount that is greater than the first threshold amount. This allows for the battery management system 100 to use the most effective or efficient temperature control device 112 to maintain the battery temperature within the optimal temperature range.

In some implementations, the battery management system 100 may draw air from a source with the coolest or warmest temperature using the one or more temperature control devices 112 associated with the source. For example, the battery management system 100 may use the one or more temperature control devices that draws air from the passenger cabin if the inside ambient temperature is less than the outside ambient temperature or the outside environment if the outside ambient temperature is less than the inside ambient temperature to cool the battery 106 the fastest. Similarly, the battery management system 100 may use the one or more temperature control devices that draws air from the passenger cabin if the inside ambient temperature is greater than the outside ambient temperature or the outside environment if the outside ambient temperature is greater than the inside ambient temperature to warm the battery 106 the fastest.

In some implementations, the battery management system 100 may select or use multiple temperature control devices 112 to control or maintain the battery temperature within the optimal temperature range. For example, the battery management system may operate multiple temperature control devices 112, such as the blower 128 and the window 126, at the same time to adjust the battery temperature to the optimal temperature range at a faster rate.

Figure 7:
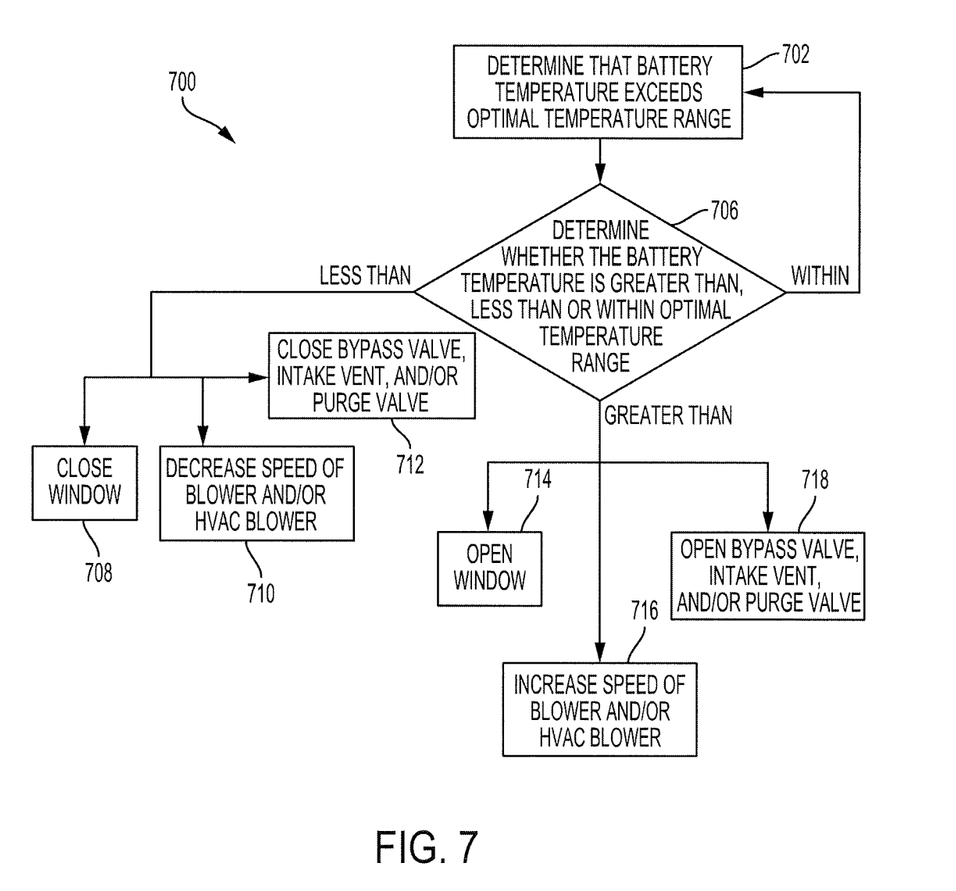
FIG. 7 is a flow diagram of an example process to operate the one or more temperature control devices according to an aspect of the invention.

The battery management system 100 operates the one or more temperature control devices 112 to adjust or control the battery temperature so that the battery 106 operates within the optimal temperature range (620). FIG. 7 further describes the operation of the one or more temperature control devices 112.

FIG. 7 describes the process for operating the one or more temperature control devices 112 to control or maintain the battery temperature within an optimal temperature range. One or more computers or one or more data processing apparatuses, for example, the ECU 104 of the battery management system 100 of FIG. 1, appropriately programmed, may implement the process 700.

The battery management system 100 determines that the battery temperature exceeds the optimal temperature range and may calculate the difference between the battery temperature and the optimal temperature range, as described above (702). The battery management system 100 may compare the battery temperature and the optimal temperature range to determine that the battery temperature exceeds the optimal temperature range.

The battery management system 100 determines whether the battery temperature is greater than, less than or within the optimal temperature range (704). The battery management system 100 compares the battery temperature to the maximum temperature of the optimal temperature range and the minimum temperature of the optimal temperature range. If the battery temperature is greater than or equal to the minimum temperature and less than or equal to the maximum temperature, the battery management system 100 determines that the battery temperature is within the optimal temperature range and continues to monitor the battery temperature. If the battery temperature is greater than the maximum temperature, the battery management system 100 determines that the battery temperature is greater than the optimal temperature range. If the battery temperature is less than the minimum temperature, the battery management system 100 determines that the battery temperature is less than the optimal temperature range.

When the battery temperature is less than the optimal temperature range, the battery management system 100 causes at least one of the one or more temperature control devices to increase the battery temperature until the battery temperature is within the optimal temperature range. The battery management system 100 may close or partially close a window 126 (708), decrease a speed of the blower 128 or HVAC blower 132 (710) and/or close or partially close the intake vent 138, the bypass valve 130 or the purge vent 134 (712) to increase the battery temperature.

For example, the ECU 104 may send a signal to a vehicle control module 136 that raises the position of the window 126. The vehicle control module 136 may partially raise or fully raises the window 126 to partially close or fully close the window, respectively. The amount that the vehicle control module 136 raises the window 126 may be based on the difference between the battery temperature and the optimal temperature range. As the window 126 is raised, the amount of airflow or ventilation into the passenger cabin decreases. Thus, when the battery temperature is significantly less than the optimal temperature range, the battery management system 100 may raise the window 126 higher than when the difference is smaller. This may cause the battery temperature to increase because there is less air circulation to the battery compartment or area through the intake vent 138.

In another example, the ECU 104 may send a signal to a pump or a compressor to decrease the speed of the blower 128 or the HVAC blower 132, respectively. The signal may indicate the amount to decrease the speed of the blower 128 or the HVAC blower 132. The amount may be based on the difference between the battery temperature and the optimal temperature range. As the speed of the blower 128 or the HVAC blower 132 decreases, the amount or rate of airflow into the battery compartment or area where the battery 106 resides decreases. Thus, when the battery temperature is significantly less than the optimal temperature range, the battery management system 100 decreases the speed of the blower 128 or the HVAC blower 132 more than when the difference is smaller. This may cause the battery temperature to increase because there is less air circulation to the battery compartment or area.

In another example, the ECU 104 may send a signal to an actuator to position the bypass valve 130 or the purge vent 134 to decrease the flow of refrigerant directed toward the battery compartment or area or decrease the amount of air exhausted out the battery compartment or area, respectively. In another example, the ECU 104 may send the signal to an actuator to position the intake vent 138 to decrease the amount of air circulated within or directed to the battery compartment or area.

The ECU 104 may cause the bypass valve to close or further close to a fully closed or partially opened position.

The amount that the bypass valve 130 closes may be based on the difference between the battery temperature and the optimal temperature range. The amount that the bypass valve 130 is closed may increase as the difference that the battery temperature is less than the optimal temperature range increases. This reduces the amount of refrigerant flow to the battery compartment or area and may increase the battery temperature.

The ECU 104 may cause the purge vent 134 to close or further close to a fully closed or partially closed position. The amount that the purge vent 134 closes may be based on the difference between the battery temperature and the optimal temperature range. The amount that the purge vent 134 is closed may increase as the difference that the battery temperature is less than the optimal temperature range increases. This reduces the amount of air that may be exhausted out of the battery compartment or area and may increase the battery temperature.

The ECU 104 may cause the intake vent 138 to close or further close to a fully closed or partially closed position. The amount that the intake vent 138 closes may be based on the difference between the battery temperature and the optimal temperature range. The amount that the intake vent 138 is closed may increase as the difference that the battery temperature is less than the optimal temperature range increases. This reduces the amount of air that is circulated within and directed to the battery compartment or area and may increase the battery temperature.

When the battery temperature is greater than the optimal temperature range, the battery management system 100 causes at least one of the one or more temperature control devices 112 to decrease the battery temperature until the battery temperature is within the optimal temperature range. The battery management system 100 may open or partially open a window 126 (714), increase a speed of the blower 128 or the HVAC blower 132 (716) and/or open or partially open the bypass valve 130, the intake vent 138 or the purge vent 134 (718) to decrease the battery temperature.

For example, the ECU 104 may send a signal to a vehicle control module 136 that lowers the position of the window 126. The vehicle control module 136 may partially lower or fully lower the window 126 to partially open or fully open the window 126, respectively. The amount that the vehicle control module 136 lowers the window 126 may be based on the difference between the battery temperature and the optimal temperature range. As the window 126 is lowered, the amount of air flow or ventilation into the passenger cabin increases. Thus, when the battery temperature is significantly greater than the optimal temperature range, the battery management system 100 may lower the window 126 more than when the difference is smaller. This may cause the battery temperature to decrease because there is more air circulation to the battery compartment or area.

In another example, the ECU 104 may send a signal to a pump or a compressor to increase the speed of the blower 128 or the HVAC blower 132, respectively. The signal may indicate the amount to increase the speed of the blower 128 or the HVAC blower 132. The amount may be based on the difference between the battery temperature and the optimal temperature range. As the speed of the blower 128 or the HVAC blower 132 increases, the amount or rate of airflow into the battery compartment or area where the battery 106 resides increases. Thus, when the battery temperature is significantly more than the optimal temperature range, the battery management system 100 increases the speed of the blower 128 or the HVAC blower 132 more than when the difference is smaller. This may cause the battery temperature to decrease because there is more air circulation to the battery compartment or area.

In another example, the ECU 104 may send a signal to an actuator to position the bypass valve 130 or the purge vent 134 to increase the flow of refrigerant directed toward the battery compartment or area or increase the amount of air exhausted out the battery compartment or area, respectively. In another example, the ECU 104 may send the signal to the actuator to position the intake vent 138 to increase the flow of air into the battery compartment or area from the passenger cabin.

The ECU 104 may cause the bypass valve 130 to open or further open to a fully open or partially opened position. The amount that the bypass valve 130 opens may be based on the difference between the battery temperature and the optimal temperature range. The amount that the bypass valve 130 is opened may increase as the difference that the battery temperature is greater than the optimal temperature range increases. This increases the amount of refrigerant flow to the battery compartment or area and may decrease the battery temperature.

The ECU 104 may cause the purge vent 134 to open or further open to a fully opened or partially opened position. The amount that the purge vent 134 opens may be based on the difference between the battery temperature and the optimal temperature range. The amount that the purge vent 134 is opened may increase as the difference that the battery temperature is greater than the optimal temperature range increases. This increases the amount of air that is exhausted out of the battery compartment or area and may decrease the battery temperature.

The ECU 104 may cause the intake vent 138 to open or further open to a fully opened or partially opened position. The amount that the intake vent 138 opens may be based on the difference between the battery temperature and the optimal temperature range. The amount that the intake vent 138 is opened may increase as the difference that the battery temperature is greater than the optimal temperature range increases. This increases the amount of air that is diverted to and circulated within the battery compartment or area and may decrease the battery temperature.

In some implementations, the ECU 104 performs the functions of the vehicle control module 136 and directly interacts with the one or more temperature control devices 112 to control the one or more temperature control devices 112. In some implementations, the battery management system 100 performs a combination of the actions, e.g., opening the window 126 and increasing the speed of the blower 128, to the one or more temperature control devices 112 to increase or decrease the battery temperature.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A battery management system for controlling a temperature of a battery of a vehicle, comprising:
a battery for storing and providing an electrical charge;

a sensor for measuring or detecting the temperature of the battery;

a plurality of temperature control devices that are configured to be controlled or adjusted to control the temperature of the battery; and an electronic control unit coupled to the battery, the sensor and the plurality of temperature control devices and configured to:
obtain the temperature of the battery,
determine whether the temperature of the battery exceeds an optimal temperature range,
select a temperature control device from among the plurality of temperature control devices to control or adjust the temperature of the battery to be within the optimal temperature range based on a comparison between the temperature of the battery and an outside ambient temperature, and
control the selected temperature control device when the temperature of the battery exceeds the optimal temperature range to adjust the temperature of the battery to be within the optimal temperature range.

2. The battery management system of claim 1, wherein the the plurality of temperature control devices include at least one of a blower of a heating, ventilation and air conditioning (HVAC) unit, a window, a purge vent, intake vent or a separate blower.

3. The battery management system of claim 1, wherein the electronic control unit is further configured to:
determine that the temperature of the battery is greater than the optimal temperature range.

4. The battery management system of claim 3, wherein the plurality of temperature control devices include at least one of a blower or a window, wherein to control the selected temperature control device the electronic control unit is configured to:
increase a speed of the blower to direct more colder air toward the battery to cool the battery;
open the purge vent to exhaust air surrounding the battery; or
cause the window to open to increase an amount colder air directed toward the battery to cool the battery.

5. The battery management system of claim 1, wherein the electronic control unit is further configured to:
determine that the temperature of the battery is less than the optimal temperature range; and
determine a difference between the temperature of the battery and a minimum of the optimal temperature range.

6. The battery management system of claim 5, wherein to control the selected temperature control device the electronic control unit is configured to:
cause the selected temperature control device to decrease circulation of cold air or increase circulation of warm air to increase the temperature of the battery based on the difference.

7. The battery management system of claim 1, wherein the electronic control unit is configured to:
determine that the temperature of the battery exceeds the optimal temperature range; and
control the selected temperature control device to increase the temperature of the battery when the temperature of the battery is below the optimal temperature range and decrease the temperature of the battery when the temperature of the battery is above the optimal temperature range.

8. The battery management system of claim 7, wherein to control the selected temperature control device the electronic control unit is configured to adjust a bypass valve or switch that diverts coolant from the HVAC unit to the battery to cool the battery.

9. A battery management system of a vehicle, comprising:
a battery for storing and distributing an electrical charge;
a plurality of temperature control devices that manage a battery compartment temperature; and
an electronic control unit coupled to the battery and the plurality of temperature control devices and configured to:
obtain a battery temperature,
determine that the battery temperature exceeds a normal operation temperature range,
select a temperature control device from among the plurality of temperature control devices to adjust the battery temperature to be within the optimal temperature range based on a comparison between the battery temperature and an outside ambient temperature,
control the selected temperature control device to increase the battery compartment temperature when the battery temperature is less than the normal operation temperature range, and
control the selected temperature control device to decrease the battery compartment temperature when the battery temperature is greater than the normal operation temperature range.

10. The battery management system of claim 9, further comprising:
a plurality of sensors including a battery compartment temperature sensor and a battery temperature sensor, wherein the electronic control unit is configured to:
obtain, using the battery compartment temperature sensor, the battery compartment temperature; and
compare the battery compartment temperature with the battery temperature.

11. The battery management system of claim 10, wherein the plurality of temperature control devices include at least one of a blower of a heating, ventilation or air conditioning (HVAC) unit, a window a separate blower, an intake vent or a bypass valve or switch.

12. The battery management system of claim 11, wherein the plurality of temperature control devices include the bypass valve or switch that is configured to divert coolant from the HVAC unit to the battery to decrease the battery temperature.

13. A method fix controlling a temperature of a battery of a vehicle, comprising:
obtaining, by a processor, a battery temperature of the battery;
determining, by the processor, that the battery temperature exceeds a normal operation temperature range;
selecting, by the processor, a temperature control device from among a plurality of temperature control devices to control or adjust the battery temperature to be within the normal operation temperature range based on a comparison between the battery temperature and an outside ambient temperature, and
increasing, by the processor using the selected temperature control device, air flow directed at the battery to reduce the battery temperature when the battery temperature is greater than the normal operation temperature range; or
purging, by the processor using the selected temperature control device, air surrounding the battery to reduce the battery temperature when the battery temperature is greater than the normal operation temperature range.

14. The method of claim 13, comprising:
decreasing, by the processor using the selected temperature control device, air flow directed at the battery to increase the battery temperature when the battery temperature is less than the normal operation temperature range.

15. The method of claim 14, further comprising:
determining, by the processor, a difference between the battery temperature and a maximum of the normal operation temperature range.

16. The method of claim 15, wherein increasing the airflow directed at the battery is based on the difference between the battery temperature and the maximum of the normal operation temperature range.

17. The method of claim 15, wherein decreasing the airflow directed at the battery is based on the difference between the battery temperature and a minimum of the normal operation temperature range.

18. The method of claim 14, wherein decreasing, by the processor using the selected temperature control device, the air flow directed at the battery includes closing a window or decreasing a speed of a blower of a heating, ventilation and air conditioning (HVAC) unit.

19. The method of claim 13, wherein increasing, by the processor using the selected temperature control device, the air flow directed at the battery includes opening a window or increasing a speed of a blower of a heating, ventilation and air conditioning (HVAC) unit.

* * * * *